July 17, 1951  J. J. PIROS  2,560,660
NONLEAKING ROTARY SEAL
Filed March 11, 1949
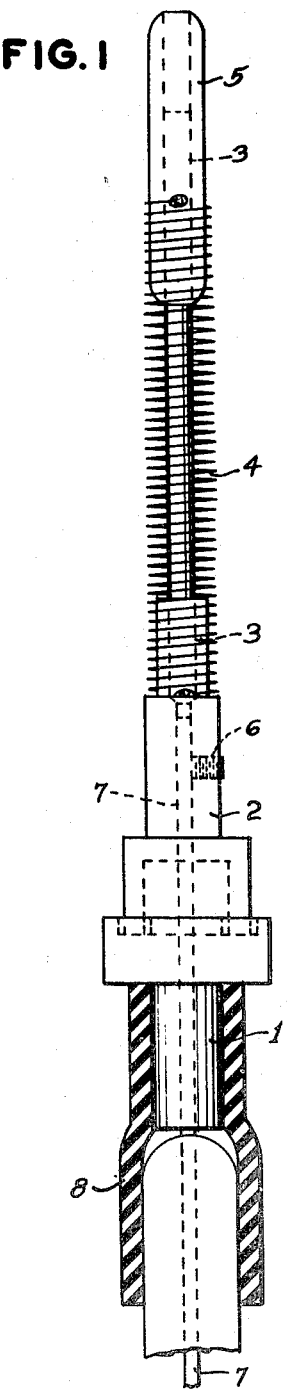
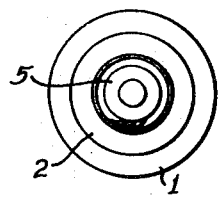
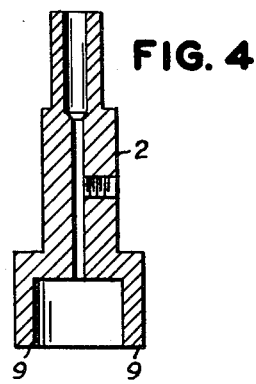
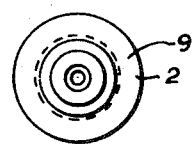
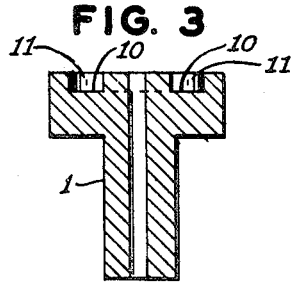
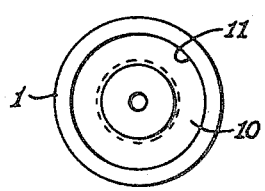
INVENTOR
John J. Piros
BY
ATTORNEYS Patented July 17, 1951

2,560,660

UNITED STATES PATENT OFFICE 2,560,660

NONLEAKING ROTARY SEAL

John J. Piros, Homewood, Ill., assignor to Sinclair Refining Company, New York, N. Y., a corporation of Maine Application March 11, 1949, Serial No. 80,795

1 Claim. (Cl. 286—11.15)

This invention relates to a rotary seal which is useful in the transmission of mechanical power into an evacuated space.

Quite often in connection with the operation of various pieces of apparatus at low pressures it is necessary to have a rotating shaft enter into the system. An ideal rotary seal would be non-leaking, would not consume much power through friction, and would be easy to maintain. Heretofore, attempts to solve this problem have usually made use of a packing around the rotating shaft. While this solution was satisfactory in many cases, it does not meet the conditions for an ideal seal, since it is not non-leaking, usually consumes considerable power due to friction and quite often requires considerable maintenance.

It is therefore an object of the present invention to provide a rotary seal which is substantially non-leaking even when employed to transmit power from a space at atmospheric pressure to a space at a pressure of less than 100 microns of mercury.

It is also an object of the present invention to provide a rotary seal which consumes little power through friction and which requires little maintenance.

For a more complete understanding of the rotary seal of the present invention, reference is made to the accompanying drawings in which a specific embodiment thereof is illustrated.

Fig. 1 represents a side elevation of the rotary seal, and Fig. 2 represents a top view thereof. Figs. 3 and 4 show in sectional elevation specific parts of the device of Fig. 1, with Figs. 5 and 6 being their respective top views.

Referring now to Fig. 1, the numeral 1 represents a stationary member which may be attached to the evacuated space by means of a rubber tube 8. If desired, the bottom portion of the stationary member may be made with a standard taper machined on it so as to facilitate its insertion into a glass taper. This stationary member is made of "Teflon" (tetrafluoroethylene polymer) bar stock.

Still referring to Fig. 1, the numeral 2 represents a rotatable member, machined from cold rolled steel. Other metals, such as nickel or copper, may also be used for the rotatable member.

A straight piece of steel rod 3 is silver-soldered to the top of member 2, and a spring 4 is positioned between the member 2 and a sleeve 5, being soldered to both of them. The sleeve 5 is attached to the chuck of the stirring motor, member 2 being driven by spring 4 which is affixed to sleeve 5 and member 2.

A small set screw 6 is provided to attach to the rotating member 2 the rotary shaft 7 which transmits the power into the evacuated space. The set screw is sealed over with high temperature cement during operation.

Before the rotary seal is put into operation, the sealing face 9 of the rotating member 2 is given a high polish using crocus cloth and a drop or two of a suitable lubricant, such as a high viscosity lubricating oil, a silicone grease, or "Apiezon" grease, is inserted between the sealing faces 10 and 9, respectively, of members 1 and 2. In the preferred form sealing face 10 is the flat surfaced bottom of a shallow annular recess 11 located in the upper end of member 1, as shown in Figures 3 and 5, for example. In such case, sealing face 9 of rotatable member 2 is designed to lie in recess 11. The flat surfaced contact between sealing faces 9 and 10 prevents leakage into the evacuated space between members 1 and 2. The pressure between faces of the seal may be varied by varying the distance between the sleeve 5 and the member 2.

Using this seal, it has been found possible to pump a system down to the lowest pressure capable of the pump used, while rotating the seal at speeds up to 6,000 R. P. M. When this seal is used in a micro vacuum still, such as that described in the Glover and Piros application, Serial No. 80,796, filed of even date herewith and entitled "Apparatus," it has been found possible to pump down the column and surge bottle to the proper pressure and then shut off the vacuum pump and complete an entire distillation at a low pressure without having the system pressure rise appreciably during the course of the distillation.

I claim:

A rotary seal for use in transmission of mechanical power into an evacuated space comprising a rubber tube adapted to be connected with said evacuated space, a stationary member of tetrafluoroethylene polymer having a bore extending centrally therethrough and including an inner portion disposed within said tube and an outer portion, said outer portion having an annular recess which provides a first annular sealing face at the inner surface thereof, a rotatable member having an opening therein and including a second annular sealing face in engagement with said first sealing face, a rotary shaft disposed within said opening and extending freely through said bore into said evacuated space, set screw means in said rotatable member engaging said rotary shaft for rigidly connecting said rotary shaft to said rotatable member, sealing means attached to said set screw means and said rotatable member for preventing leakage therebetween, a rod extending from and in fixed relation to said rotatable member, a sleeve slidably positioned about said rod and adapted to be connected to a stirring motor, and a spring affixed to said sleeve and said rotatable member for transmitting rotary motion to said rotary shaft, said sleeve being movable on said rod to allow adjustment of the spring pressure between said first and second annular sealing faces.

JOHN J. PIROS.

REFERENCES CITED

The following references are of record in the file of this patent:

UNITED STATES PATENTS

| Number | Name | Date |
|---|---|---|
| 1,066,240 | Artz et al. | July 1, 1913 |
| 1,590,834 | King | June 29, 1926 |
| 1,788,966 | Wilson | Jan. 13, 1931 |
| 2,179,824 | Kip | Nov. 14, 1939 |
| 2,467,312 | Jack | Apr. 12, 1949 |

FOREIGN PATENTS

| Number | Country | Date |
|---|---|---|
| 348,374 | Great Britain | May 14, 1931 |